United States Patent [19]

Imura et al.

[11] 4,182,555

[45] Jan. 8, 1980

[54] AUTOMATIC FOCUSING SYSTEM FOR USE IN CAMERA

[75] Inventors: Toshinori Imura; Akira Yamanaka, both of Sakai, Japan

[73] Assignee: Minolta Camera Kabushiki Kaisha, Osaka, Japan

[21] Appl. No.: 954,173

[22] Filed: Oct. 24, 1978

[30] Foreign Application Priority Data

Dec. 9, 1977 [JP] Japan .................................. 52-148422

[51] Int. Cl.$^2$ ................................................ G03B 3/10
[52] U.S. Cl. ........................................................ 354/25
[58] Field of Search ............................ 354/25, 195, 198; 352/140; 355/56; 356/4

[56] References Cited

U.S. PATENT DOCUMENTS

| | | | |
|---|---|---|---|
| 3,442,193 | 5/1969 | Pagel | 354/25 |
| 3,723,003 | 3/1973 | Vockenhuber et al. | 352/140 X |
| 3,945,023 | 3/1976 | Stauffer | 354/25 |

Primary Examiner—Michael L. Gellner
Attorney, Agent, or Firm—Wenderoth, Lind & Ponack

[57] ABSTRACT

A camera employing an automatic focusing system has a movable objective lens which is automatically moved from an initial position to a properly focused position in accordance with a distance signal indicative of the distance between the camera and a target object to be photographed from a distance measuring element. The automatic focusing system includes a discriminator which discriminates whether the distance measuring element properly produces the distance signal or fails to produce such distance signal. The objective lens is moved only when the distance signal is properly produced or when a substitute signal is forcibly produced from a manual control unit for the substitution of the distance signal.

10 Claims, 3 Drawing Figures

AUTOMATIC FOCUSING SYSTEM FOR USE IN CAMERA

BACKGROUND OF THE INVENTION

The present invention relates to a camera provided with an automatic focusing system wherein an objective lens assembly of the camera is automatically shifted in an axial direction thereof to an optimum position for focusing a target object to be photographed on a focal plane of the camera, in accordance with a control signal produced from a distance detection device and being indicative of a distance between a target object to be photographed and the camera and, more particularly, to means provided in the automatic focusing system for disabling the system when no control signal is produced from the distance detection device.

Conventionally, there have been proposed various types of cameras provided with the automatic focusing system coupled with a camera operation disabling means, one of which is disclosed in U.S. Pat. No. 3,442,193 to A. B. Pagel. The automatic focusing system disclosed therein includes a movable objective lens which moves between a hyperfocal or infinity position and near position relative to the focal plane and a rangefinding means having a member positionable automatically as a function of the distance from the camera to a target object to be photographed. Both of the movable objective lens and rangefinding means are coupled to a suitable motor means, and are actuated in relation to a movement of a shutter release mechanism, particularly by the application of a finger pressure over a shutter button.

When the rangefinding means suceeds in finding the distance between the camera and the target object, as the result of actuation of the rangefinding means together with the objective lens, the objective lens is locked in a properly focused position, and, in turn, the shutter is released.

On the other hand, when the rangefinding means fails to find the camera to object distance due to the fact that the target object is too dark to be detected or the portion to be focused is a plain wall having no distinctive contrast, or by some other reasons, the objective lens will be shifted upon its final position, that is, near position, and, in turn, the motor actuating the movable objective lens is disconnected from a source of electric power. Thereafter, upon return of the shutter release mechanism to its original position incident to, for example, the removal of the finger pressure from the shutter button, the motor runs in a reverse direction to return the objective lens and rangefinding means to their original positions.

In other words, the failure of the rangefinding means to find the camera to object distance is not noticed until the objective lens is moved to the near position. This movement of the objective lens to the near position as a result of the failure of the rangefinding means to find the distance is not only useless but also allows the motor to consume electric power unnecessarily. Furthermore, it is necessary to provide means for returning the objective lens to the initial position, that is, hyperfocal position, for the purpose of allowing successive operation of the automatic focusing system.

Another type of automatic focusing system is disclosed in U.S. Pat. No. 3,945,023 to Stauffer wherein the rangefinding means disclosed therein the first and second lenses aligned in side-by-side relation to each other and a plurality of photoresponsive elements disposed behind each of the lenses for comparing a signal, obtained from the photoresponsive elements provided behind the first lens, with a signal obtained from the photoresponsive elements provided behind the second lens. When this rangefinding means fails to find the distance between the camera and the target object, the movable objective lens employed in the camera is prevented from being shifted.

However, in general, since the above described type of rangefinding means includes a capacitance component in a circuit and/or photoresponsive element, the time interval between the start of supply of an electric power and the generation of the control signal from the rangefinding means is considerably long. Therefore, it is necessary to employ a delay means for delaying the start of movement of the objective lens until the capacitance component is charged upto a desired voltage.

SUMMARY OF THE INVENTION

Accordingly, it is an important object of the present invention to provide an improved automatic focusing system wherein the objective lens is maintained in the initial position when the rangefinding means fails to find the camera to object distance.

It is another important object of the present invention to provide an improved automatic focusing system of the above described type with which is not necessary to employ any delay means.

It is a further object of the present invention to provide an improved automatic focusing system of the above described type which is simple in construction and can readily be manufactured at low cost.

In accordance with a preferred embodiment of the invention, an automatic focusing system for use in a camera comprises a distance measuring means for producing a zone signal indicative of one zone of distance where a target object to be photographed is located, said one zone of distance being selected from a plurality of zones relative to the camera. A discriminator is coupled to the distance measuring means for producing an actuating signal when the distance measuring means produces the zone signal. An objective lens mounted in a camera moves from an initial cocked position to one of a plurality of focal positions relative to a focal plane of the camera for focusing on the focal plane an image of the target object located within said one zone. The objective lens is released from the cocked position by a releasing means upon receipt of the actuating signal. The automatic focusing system according to the present invention further comprises a manual switch means for energizing the distance measuring means and a control means for controlling the position of the objective lens automatically in accordance with the zone signal.

In the automatic focusing system described above, the distance measuring means includes a plurality of output terminals for producing zone signals of different distances at different output terminals. The number of the output terminals coincides with the number of zones. The control means described above comprises a plurality of control elements which are respectively connected to the output terminals of the distance measuring means. The number of the control elements coincides with the number of the output terminals of the distance measuring means. Each control element is preferably formed by an AND element having first and second input terminals. In this case, the output terminals of the distance measuring means are connected respectively to the first input terminals of the AND elements.

The control means according to the preferred embodiment of the present invention further comprises a plurality of fixed terminal plates equal in number to the number of the AND elements. These fixed terminal plates are connected respectively to the second input terminals of the AND elements. A movable terminal plate which moves simultaneously with the movement of the objective lens is sequentially brought into contact with the fixed terminal plates. A means for impressing a predetermined voltage to the movable terminals plate is provided for sequentially applying the predetermined voltage to the fixed terminal plates and in turn to the second input terminals of the AND elements, whereby one particular AND element receiving the zone signal to the first input terminal thereof produces a control signal when the second input terminal thereof receives the predetermined voltage. An engaging means is provided for engaging the objective lens to one of the plurality of the focal positions. Normally, the engaging means is held in a disengaged relation with respect to the objective lens by a holding means. This holding means is disabled upon receipt of the control signal to cause the engaging means to engage the objective lens to one focal position.

BRIEF DESCRIPTION OF THE DRAWINGS

These and other objects and features of the present invention will become apparent from the following description taken in conjunction with preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
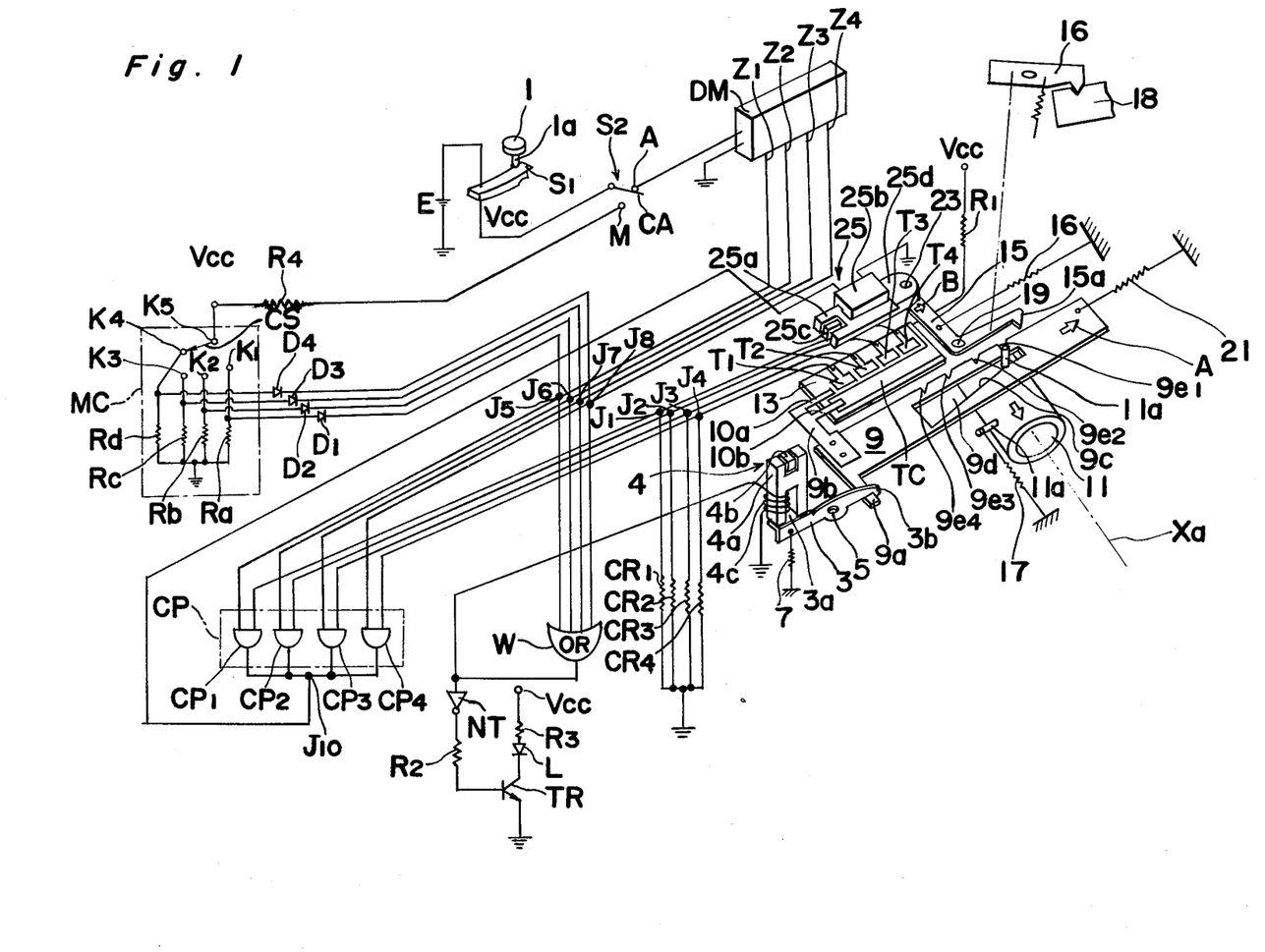
FIG. 1 is a schematic diagram of an automatic focusing system according to one embodiment of the present invention.

Referring to FIG. 1, there is shown one embodiment of an automatic focusing system according to the present invention. The automatic focusing system comprises an automatic rangefinder for producing a signal indicative of one particular zone of distances where a target object to be photographed may be located, said one particular zone of distance being selected from a plurality of zones such as zones A, B, C and D (FIG. 2) classified as near, first intermediate, second intermediate and far zones, respectively, relative to the camera, and a lens positioning mechanism for positioning an objective lens assembly 11 at a corresponding position for focusing the target object, located in said one particular zone, on the focal plane where a film is placed. Each of the components is described in detail, hereinafter.

Figure 2:
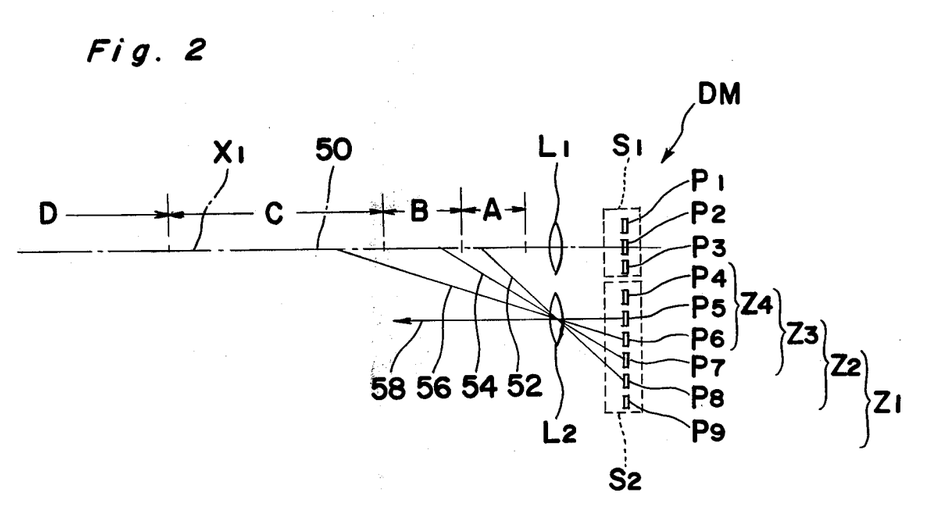
FIG. 2 is a schematic diagram of a distance measuring element employed in the system shown in FIG. 1.

The automatic rangefinder comprises a distance measuring element DM of any known type such as disclosed in U.S. Pat. No. 3,945,023 to Norman L. Stauffer or disclosed in U.S. Pat. No. 3,723,003 to Vockenhuber et al. The distance measuring element DM is schematically shown in FIG. 2 and comprises first and second stationary lens $L_1$ and $L_2$ positioned side-by-side with their principal planes contained in the same plane. Positioned behind the first lens $L_1$ is a first stationary sensing means $S_1$ which is so arranged as to receive radiation from a target object through the first lens $L_1$. A second stationary sensing means $S_2$ is similarly placed behind the second lens $L_2$ to receive radiation from the object through the second lens $L_2$. The first sensing means $S_1$ includes, in the example shown, three photoresponsive elements $P_1$, $P_2$ and $P_3$ while the second stationary sensing means $S_2$ includes, in the example shown, six photoresponsive elements $P_4$, $P_5$, $P_6$, $P_7$, $P_8$ and $P_9$. It is to be noted that the distance measuring element DM is positioned in the camera in such a manner as to render the optical axis $X_1$ of the first lens $L_1$ to extend approximately in parallel to an optical axis $Xa$ of the objective lens assembly 11 employed in the camera. The operation of the distance measuring element DM will now be described hereinbelow.

Still referring to FIG. 2, four distinct zones of distances A, B, C and D are indicated along a first optical path 50 coinciding with the optical axis $X_1$ of the first lens $L_1$. Radiation from a target object which may be located in any one of zones along the optical path 50 will pass through the first stationary lens $L_1$ and fall on the photoresponsive elements $P_1$, $P_2$, and $P_3$ of the first sensing means $S_1$. Depending upon the position of the target object, radiation from that object will also pass along a second optical path, defined by the radiation passing through the second stationary lens $L_2$, and fall on the photoresponsive elements $P_4$, $P_5$, $P_6$, $P_7$, $P_8$ and $P_9$ of the second sensing means $S_2$. Four axes of radiation 52, 54, 56 and 58 are shown in FIG. 2 as emanating from the four different positions and passing through the second stationary lens $L_2$.

If an object is located at the position within the zone A, for example, radiation therefrom will pass through the first stationary lens $L_1$ and fall on the first sensing means $S_1$, but it is not essential that a focused image be so formed. It is sufficient if a light intensity distribution identifiable by the photoresponsive elements is formed at the sensing means. When an object is at said position, an intensity distribution will be formed at the first sensing means $S_1$ and that distribution will be centered upon the photoresponsive element $P_2$ thereof. Radiation from the object at said position will also pass generally along the line 52 through the stationary lens $L_2$ and fall on the remote portion of the second sensing means $S_2$. More specifically, the intensity distribution formed on the second sensing means $S_2$ from the object at said position will be centered upon the photoresponsive element $P_8$ of the second sensing means $S_2$. Therefore, with an object at said position, the intensity of the radiation falling on the photoresponsive element $P_1$ in the first sensing means $S_1$ will be substantially equal to the intensity of the radiation falling on the photoresponsive element $P_7$ of the second sensing means $S_2$ since both intensity distribution patterns are substantially the same. Similarly, the intensity of the radiation falling on the photoresponsive element $P_2$ of the first sensing means $S_1$ will be substantially equal to the intensity of the radiation falling on the photoresponsive element $P_8$ of the second sensing means $S_2$, and the intensity of the radiation falling on the photoresponsive elements $P_3$ and $P_9$ will also be substantially equal. Therefore, when circuit means which will be described in detail later with reference to FIG. 3 determine that the intensity distribution falling on the photoresponsive elements $P_1$, $P_2$, and $P_3$ substantially matches the intensity distribution falling on the elements $P_7$, $P_8$ and $P_9$, it can be said that the object, the distance to which from the rangefinder device is to be determined, is generally located at the position within the zone A.

Similarly, if the circuit means connected to the first and second sensing means $S_1$ and $S_2$ determines that the intensity distribution falling on the photoresponsive elements $P_1$, $P_2$ and $P_3$ of the first sensing means $S_1$ is substantially identical to the intensity distribution falling on the photoresponsive elements $P_6$, $P_7$ and $P_8$ of the second sensing means $S_2$, the object whose displacement from the rangefinding device is to be sought is generally located at the position within the zone B. In like manner, if the intensity distribution falling on the photoresponsive elements $P_1$, $P_2$ and $P_3$ of the first sensing means $S_1$ substantially matches the intensity distribution falling on the three photoresponsive elements $P_5$, $P_6$ and $P_7$ of the sensing means $S_2$, it can be said that the object, from which the radiation forming such intensity distributions emanates, is generally located at a position within the zone C. And finally, if the intensity distribution falling on the photoresponsive elements $P_1$, $P_2$ and $P_3$ of the first sensing means $S_1$ substantially matches the intensity distribution falling on the first three photoresponsive elements $P_4$, $P_5$ and $P_6$ of the second sensing means $S_2$, it is understood that the object from which the radiation forming such intensity distribution emanates, is generally located at a position within the zone D.

Once the zone in which the object is located is determined in the manner described above, a distance signal carrying high voltage is produced from one of four outputs $Z_1$, $Z_2$, $Z_3$ and $Z_4$ of the distance measuring element DM, said four outputs $Z_1$ to $Z_4$ representing the four different zones A, B, C and D, respectively.

Referring to FIG. 1, the automatic rangefinder further comprises a comparator CP including four AND elements $CP_1$, $CP_2$, $CP_3$ and $CP_4$ having their first inputs connected to the four outputs $Z_1$, $Z_2$, $Z_3$ and $Z_4$ of the distance measuring element DM, respectively. Second inputs of the AND elements $CP_1$, $CP_2$, $CP_3$ and $CP_4$ are connected to resistors $CR_1$, $CR_2$, $CR_3$ and $CR_4$, respectively, by way of respective junctions $J_1$, $J_2$, $J_3$ and $J_4$. The resistors $CR_1$ to $CR_4$ are connected to the ground. Since the resistors $CR_1$, $CR_2$, $CR_3$ and $CR_4$ are of equal resistance, the junctions $J_1$, $J_2$, $J_3$ and $J_4$ produce the same amount of high voltage signal when a predetermined voltage is impressed across such resistors $CR_1$ to $CR_4$. The junctions $J_1$, $J_2$, $J_3$ and $J_4$ are also connected to terminal plates $T_1$, $T_2$, $T_3$ and $T_4$, respectively, which are bonded in a row on a platform 13 rigidly mounted in the camera. The platform 13 is also bonded with a common terminal plate TC which is connected to a source of electric power Vcc through a resistor $R_1$. The common terminal plate TC is adapted to be sequentially connected to the terminal plates $T_1$, $T_2$, $T_3$ and $T_4$ by means of a bridging plate 9b in a manner will be described in detail later.

According to the present invention, the outputs $Z_1$, $Z_2$, $Z_3$ and $Z_4$ of the distance measuring element DM are also connected to four inputs of an OR element W by way of respective junctions $J_5$, $J_6$, $J_7$ and $J_8$ for producing a high level signal from an output of the OR element W when one of the outputs $Z_1$, $Z_2$, $Z_3$ and $Z_4$ produces the high level distance signal and for producing a low level signal from an output of the OR element W when no one of the outputs $Z_1$ to $Z_4$ produces the high level distance signal. The output of the OR element W is connected through an inverter NT and a resistor $R_2$ to the base of a transistor TR. The emitter of the transistor TR is grounded while the collector of the same is connected to the source of electric power Vcc through a light emitting diode L and a resistor $R_3$. The output of the OR element W is also connected to one input of a coil assembly 4. The other input of the coil assembly 4 is connected to the ground. The coil assembly 4 includes a frame 4a made of magnetic material, a permanent magnet 4b for normally magnetizing the frame 4a and a coil 4c wound about the frame 4a between the two inputs for, when energized, cancelling the magnetic attraction of the permanent magnet 4b by developing a counteracting magnetic force on the frame 4a. The frame 4a is normally held in contact with a lever 3 by the magnetic force of attraction produced by the permanent magnet 4b, but is disengaged from the frame 4a when the coil 4c is energized. The lever 3 has a substantially intermediate portion thereof pivotally mounted on a pin 5, provided on the camera, and one end portion thereof formed with a bent-over portion 3a providing a flat area. This flat area 3a is made of magnetic material or mounted with an armature for allowing magnetic contact with the coil assembly 4. The other end portion of the lever 3 remote from the bent-over portion 3a is formed with a hook 3b engagable with a projection 9a extending from a rectangular movable plate 9 of the lens positioning mechanism which will be described in detail later. The lever 3 is biased by an urging spring 7 to rotate in a counterclockwise direction about the pin 5 towards the disengaged position with respect to the projection 9a.

The junctions $J_5$, $J_6$, $J_7$ and $J_8$ are also connected through diodes $D_1$, $D_2$, $D_3$ and $D_4$ to terminals $K_1$, $K_2$, $K_3$ and $K_4$, respectively, of a manual control circuit MC. The manual control circuit MC includes resistors Ra, Rb, Rc and Rd which are connected at one end to the terminals $K_1$, $K_2$, $K_3$ and $K_4$, respectively, and at the other end to the ground. The terminals $K_1$, $K_2$, $K_3$ and $K_4$ are manually and selectably connected to a common terminal $K_5$ through a connecting arm CS. The common terminal $K_5$ is connected through a resistor $R_4$ to a terminal M of a selecting switch $SW_2$ in which a connecting arm CA can be selectively connected to said terminal M or to a terminal A extending from one of power inputs of the distance measuring element DM. The other input of the distance measuring element DM is connected to the ground. The connecting arm CA of the switch $SW_2$ is connected to a source of power E through a switch $SW_1$. The switch $SW_1$ is coupled with a shutter release button 1 in such a manner that a slight downward movement of a shutter release button 1 together with a rod 1a thereof turns the switch $SW_1$ on to apply voltage Vcc to the connecting arm CA of the switch $SW_2$. When the connecting arm CA is held in contact with the terminal A, the electric power is supplied to the distance measuring element DM, and when the connecting arm CA is held in contact with the terminal M, the electric power is supplied to the manual control circuit MC.

The outputs of the AND elements $CP_1$, $CP_2$, $CP_3$ and $CP_4$ are connected to each other at a junction $J_{10}$ and, in turn, connected to one input of a coil assembly 25. The other input of the coil assembly 25 is connected to the ground, that is, to the body of the camera. The coil assembly 25 includes a frame 25a made of magnetic material, a permanent magnet 25c for normally magnetizing the frame 25a, a coil 25b wound about the frame 25a for, when energized, cancelling the magnetic attraction of the permanent magnet 25c by developing a counteracting magnetic force on the frame 25a, and a contact member 25d made of magnetic material. The contact member 25d is normally held in contact with the frame 25a by the magnetic force of attraction produced by the permanent magnet, but is disengaged from the frame 25a when the coil 25b is energized. The contact member 25d is connected to an L-shaped lever 15 which is included in the lens positioning mechanism described hereinbelow.

The lens positioning mechanism comprises an elongated and rectangular movable plate 9 coupled with a spring means 21 for urging the elongated movable plate 9 in a longitudinal direction as indicated by an arrow A. The movable plate 9 has a triangular opening 9d formed approximately at a central portion thereof and having a slanted edge defined at 9c. The slanted edge 9c slidingly contacts a projection 11a rigidly mounted on the objective lens assembly 11. The objective lens assembly 11 is so arranged as to move between hyperfocal or infinity and near positions in alignment with the optical axis Xa of the lens 11, and is biased towards, for example, the near position by means of an urging spring 17. As the movable plate moves in the direction A, the projection 11a slidingly moves along the slanted edge 9c to cause the objective lens assembly 11 to move towards the near position. The bridging plate 9b which is made of electric conductive material and rigidly carried by the movable plate 9 extends ourwardly from the movable plate 9 and has a pair of arms 10a and 10b extending in parallel to a direction of movement of the movable plate 9. As the bridging plate 9b moves towards the direction A together with the movable plate 9, the arm 10b slidingly moves over the common terminal plate TC, while the arm 10a slidingly and sequentially moves over the terminal plates $T_1$, $T_2$, $T_3$ and $T_4$. The movable plate 9 is formed with four detent recesses $9e_1$, $9e_2$, $9e_3$ and $9e_4$ defined in one side edge of the plate 9 for the engagement with the L-shaped lever 15. The L-shaped lever 15 has a substantially intermediate portion pivotally mounted on a pin 19 provided on the body of the camera, and is biased by a spring 16 in a direction indicated by an arrow B about the pin 19. One end of the lever 15 is provided with the contact member 25d as described above while the other end of the lever 15 is provided with a hook 15a which is engageable in any one of the detent recesses $9e_1$, $9e_2$, $9e_3$ and $9e_4$ when rotated in the direction B. A shutter release lever 16 which is in association with the lever 15 releases a leading curtain 18 of a focal plane shutter at a moment when the hook 15a of the lever 15 is engaged with any one of the detent recesses $9e_1$, $9e_2$, $9e_3$ and $9e_4$. As described above, the movable plate 9 has one end formed with the projection 9a for the engagement with the hook 3a of the lever 3. The operation of the automatic focusing system described above will now be given herein below.

Starting from the position as shown in FIG. 1 in which the switch $SW_2$ has the connecting arm CA held in contact with the terminal A while a shutter releasing mechanism (not shown) is loaded and ready for taking a photographic picture, the automatic focusing system is actuated to measure the distance between the target object and the camera when the shutter button 1 is depressed to such an extent that the rod 1a extending downwardly from the button 1 presses the switch $SW_1$ to supply electric power Vcc through the selecting switch $SW_2$ to the distance measuring element DM. Upon receipt of the power, the distance measuring element DM produces a high level signal from one of the outputs $Z_1$, $Z_2$, $Z_3$ and $Z_4$, indicating that the target object T is within one of the zones A, B, C and D. Assuming that the target object T is within the zone B, the high level distance signal will be produced from the output $Z_2$. The presence of such distance signal on one of the outputs $Z_1$ to $Z_4$ actuates the OR element W to produce a high level signal therefrom to excite the coil 4c for producing a magnetic force in the frame 4a. The thus produced magnetic force counteracts with the magnetic force of the permanent magnet 4b to release the bent-over portion 3a of the lever 3 from the frame 4a. Thereafter, the released lever 3 rotates about the pin 5 in accordance with the biasing force of the spring 7 for disengaging the movable plate 9 from the lever 3. Thus, the movable plate 9 is moved in the direction A at a predetermined speed together with the bridging plate 9d. As the terminal plates $T_1$, $T_2$, $T_3$ and $T_4$ are sequentially bridged and shortcircuited to the common terminal plate TC by the bridging plate 9d, a predetermined voltage will be produced sequentially across the resistors $CR_4$, $CR_3$, $CR_2$ and $CR_1$. Such voltage is sequentially applied to the AND elements $CP_4$, $CP_3$, $CP_2$ and $CP_1$. According to the above assumption, since the high level signal is produced from the output $Z_2$ while the low level signal is produced from the other outputs $Z_1$, $Z_3$ and $Z_4$, only the AND element $CP_2$ can be triggered on to produce a high level signal therefrom. More particularly, when the arm 10a of the bridging plate 9b slidingly moves over the terminal plate $T_3$, the voltage produced across the resistor $CR_2$ triggers the AND element $CP_2$ on to generate the high level signal therefrom. Such high level signal is applied to the coil 25b for producing a magnetic force in the frame 25a. This magnetic force so produced in the frame 25a counteracts with the magnetic force of the permanent magnet 25c to release the contact member 25d, which has been attracted to the frame 25a by the magnetic force of the magnet 25c, from the frame 25a to allow the rotation of the L-shaped lever 15 in the direction B. Upon rotation of the L-shaped lever 15, the hook 15a engages into the detent recess $9e_3$ to stop the movement of the movable plate 9. Thus, the objective lens assembly 11 which has been moving towards the near position by the action of the spring 17 stops at the first intermediate position where the target object located within the zone B can be properly focused on a focal plane (not shown) in the camera.

Immediately after the objective lens assembly 11 has been moved to the first intermediate position, the rotation of the L-shaped lever 15 to the engaged position with respect to the detent recess $9e_3$ is completed and this in turn causes the lever 16 to rotate about the axis thereof for releasing the leading curtain of the shutter releasing mechanism, thereby exposing the film surface.

It is to be noted that the terminal plates $T_1$, $T_2$, $T_3$ and $T_4$ are arranged in a row in such an order as to correspond to the order of development of the zones D, C, B and A in the object space away from the objective lens assembly 11 of the camera, respectively. Yet, each of the terminal plates $T_1$, $T_2$, $T_3$ and $T_4$ has such a width, as measured in the direction of the movement of the bridging plate 9b, that the electric contact between the terminal plates $T_1$, $T_2$, $T_3$ and $T_4$ and the common terminal plate TC through the bridging plate 9b continues for a period of time required for the objective lens assembly 11 to axially move a distance corresponding to the distance range of the corresponding zone.

It is further to be noted that the detent recesses $9e_1$, $9e_2$, $9e_3$ and $9e_4$ are positioned in such a manner that the hook $3b$ may be engaged into a recess $9e_1$, $9e_2$, $9e_3$ or $9e_4$ immediately after the arm $10a$ has moved past the corresponding terminal plate $T_1$, $T_2$, $T_3$ or $T_4$.

When the target object is considerably dark to such an extent as to produce a very weak radiation therefrom or when the target object scarcely has such a contrast as in a white plain wall as to produce a uniform radiation therefrom, it is impossible to discriminate which one of the four groups of photoresponsive elements ($P_4$, $P_5$, $P_6$; $P_5$, $P_6$, $P_7$; $P_6$, $P_7$, $P_8$; and $P_7$, $P_8$, $P_9$) of the second sensing means $S_2$ has the intensity distribution identical to that of the photoresponsive elements $P_1$, $P_2$ and $P_3$ of the first sensing means $S_1$. In the above case or in other cases where the distance measuring element DM fails to produce the distance signal from any one of the outputs $Z_1$, $Z_2$, $Z_3$ and $Z_4$, the OR element W is so actuated as to produce a low level signal therefrom. Said low level signal from the OR element W is applied, on one hand, to the inverter NT wherein the low level signal is inverted into high level signal and, on the other hand, to the coil $4c$ of the coil assembly 4. The inverted high level signal conducts the transistor TR to energize the light emitting diode L for the indication of the failure of the distance measuring element DM to produce the distance signal, while the low level signal applied to the coil $4c$ maintains the lever 3 in the engaged position with the projection $9a$.

When the photographer is notified that the distance measuring element DM has failed to produce the distance signal, he may turn the connecting arm CA of the selecting switch $SW_2$ from the terminal A to terminal M for changing the direction of path of electric power from the distance measuring element DM to the manual control circuit MC. In the manual control circuit MC, the connecting arm CS is selectively connected to any one of the terminals $K_1$ to $K_4$ for forcibly producing a substitute signal from the selected terminal when the switch $SW_1$ is turned on as a result of the depression of the shutter button 1. Assuming that the connecting arm CS is connected to the terminal $K_2$, the substitute signal will be produced from the terminal $K_2$ as the shutter button 1 is pressed. The substitute signal so produced is applied through the diode $D_2$ and the junction $J_6$ to the first input of the AND element $CP_2$ and also, at the same time, to one of the four inputs of the OR element W. Therefore, the OR element W is so actuated as to generate a high level signal therefrom for releasing the lever 3 in the same manner described above and yet preventing the light emitting diode L from being lighted. Thereafter, the lens positioning mechanism operates in a similar manner to position the objective lens assembly 11 at the first intermediate position.

Figure 3:
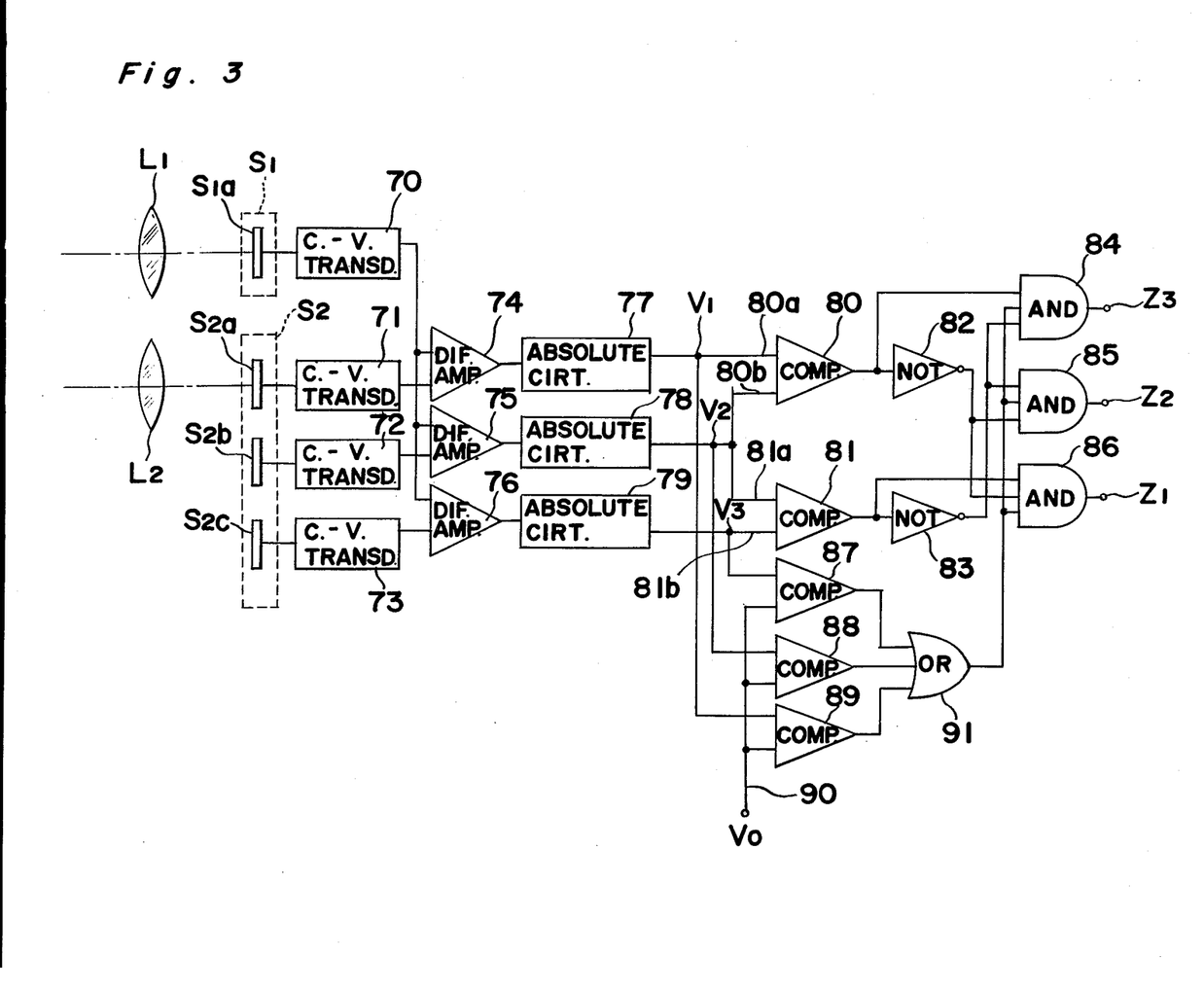
FIG. 3 is a block diagram of the distance measuring element employed in the system shown in FIG. 1.

Referring to FIG. 3, there is shown an explanatory block diagram of the distance measuring element DM which is so arranged as to discriminate three different zones of distances: near zone; intermediate zone; and far zone. The reduction in number of zones from four to three is merely for the purpose of simplifying the description. In FIG. 3, the first and second stationary sensing means $S_1$ and $S_2$ are positioned behind the first and second lens devices $L_1$ and $L_2$, respectively, in the manner described above. The first sensing means $S_1$ includes, in the explanatory example shown, one photoresponsive element $S1a$, while the second sensing means $S_2$ includes, in the explanatory example shown, three photoresponsive elements $S2a$, $S2b$ and $S2c$. An output terminal from the photoresponsive element $S1a$ of the first sensing means $S_1$ is connected to a current-voltage transducer 70. Similarly, the output terminals from the three photoresponsive elements $S2a$, $S2b$ and $S2c$ are connected to corresponding current-voltage transducers 71, 72 and 73, respectively.

A differential amplifier 74 receives input signals from the current-voltage transducer 70 of the first sensing means $S_1$ and the first current-voltage transducer 71 of the second sensing means $S_2$. Similarly, a differential amplifier 75 receives input signals from the current-voltage transducer 70 of the first sensing means $S_1$ and the second current-voltage transducer 72 of the second sensing means $S_2$. A further differential amplifier 76 receives input signals from the current-voltage transducer 70 of the first sensing means $S_1$ and the third current-voltage transducer 73 of the second sensing means $S_2$. In other words, the differential amplifiers 74, 75 and 76 are provided for comparing the output signal of the current-voltage transducer 70 of the first sensing means $S_1$ with each of the current-voltage transducers 71, 72 and 73, respectively, of the second sensing means $S_2$.

Output signals from the differential amplifiers 74, 75 and 76 are supplied to absolute circuits 77, 78 and 79, respectively, for taking absolute values of the difference signals produced from the differential amplifiers 74, 75 and 76, respectively.

An operational amplifier or comparator 80 has an inverting input $80a$ thereof connected to the absolute circuit 77, and the non-inverting input $80b$ thereof connected to the absolute circuit 78. Similarly, an operational amplifier or comparator 81 has an inverting input $81a$ thereof connected to the absolute circuit 79, and the non-inverting input $80b$ thereof connected to the absolute circuit 78.

Elements designated by the reference numerals 82 and 83 are NOT elements, while the elements designated by the reference numerals 84, 85 and 86 are AND elements, each having three input terminals. The output from the comparator 80 is connected directly to one input of the AND element 84, and also through the NOT element 82 to one input of the AND element 85 and one input of the AND element 86. Similarly, the output from the comparator 81 is connected directly to one input of the AND element 86, and also through the NOT element 83 to one input of the AND element 84 and one input of the AND element 85.

The outputs of the absolute circuits 77, 78 and 79 are also connected to non-inverting inputs of operational amplifiers or comparators 89, 88 and 87, respectively. The inverting inputs of the comparators 87, 88 and 89 are connected to a line 90 carrying a predetermined voltage Vo. Outputs of the comparators 87, 88 and 89 are connected to inputs of an OR element 91, and the output of the OR element 91 is connected to AND elements 84, 85 and 86. Outputs $Z_1$, $Z_2$ and $Z_3$ of the AND elements 86, 85 and 84 produce distance signals indicating near, intermediate and far zones of distance, respectively. The operation of the distance measuring element described above is given hereinbelow.

First of all, assuming that the target object is located at the near zone, a signal produced from the photoresponsive element $S2c$ of the second sensing means $S_2$ will be approximately the same as a signal produced from the photoresponsive element $S1a$ of the first sensing means $S_1$, the latter signal being hereinafter referred to as a reference signal. In view of this, a signal produced from the photoresponsive element $S2b$ of the second sensing means $S_2$ will be a little different in amplitude from the reference signal, while a signal produced from the photoresponsive element $S2a$ of the second sensing means $S_2$ will be further different from the reference signal. Accordingly, the differential amplifier 76 comparing the signal from the photoresponsive element $S2c$ with the reference signal will produce a low level signal since these two signals are quite similar to each other. In this sense, the differential amplifier 75 comparing the signal from the photoresponsive element $S2b$ with the reference signal will produce a medium high level signal while the differential amplifier 74 comparing the signal from the photoresponsive element $S2a$ with the reference signal will produce a high level signal. Therefore, the relation between the voltage levels $V_1$, $V_2$ and $V_3$ of the outputs from the absolute circuits 77, 78 and 79, respectively, is $V_1 > V_2 > V_3$. This relation causes the comparator 80 to produce a low level signal and the comparator 81 to produce a high level signal.

The voltage Vo applied to the line 90 has the level somewhere between $V_2$ and $V_3$, provided that the relation of the voltage levels $V_1$, $V_2$ and $V_3$ is $V_1 > V_2 > V_3$. The purpose of employing the comparators 87, 88 and 89 is to determine whether or not at least one of the voltage levels $V_1$, $V_2$ and $V_3$ is greater than a predetermined voltage Vo which would be the necessary voltage for one of the differential amplifier 74, 75 or 76 to produce when a signal produced from any one of the photoresponsive elements $S2a$, $S2b$ and $S2c$ of the second sensing means $S_2$ is distinctively different in amplitude from the signal produced from the photoresponsive element $S1a$ of the first sensing means $S_1$. Since in the case described above, voltages $V_1$ and $V_2$ are greater than the predetermined voltage Vo, comparators 88 and 89 are actuated to produced a high level signal to the OR element 91 for causing the OR element 91 to produce a high level signal.

Under the condition described above, the AND element 84 receives low, high and low level signals from the comparator 80, OR element 91 and NOT element 83, respectively. Thus, the output terminal $Z_3$ of the AND element 84 produces a low level signal. Likewise, the AND element 85 receives low, high and high level signals from the NOT element 83, OR element 91 and NOT element 82, respectively. Thus, the output terminal $Z_2$ of the AND element 85 produces a low level signal. On the contrary, the AND element 86 receives high, high and high level signals from the comparator 81, NOT element 82 and OR element 91, respectively. Thus, the output terminal $Z_1$ of the AND element 86 produces a high level signal indicating that the target object is located within the near zone of distance.

Secondly, assuming that the target object is located at the intermediate zone, a signal produced from the photoresponsive element $S2b$ of the second sensing means $S_2$ will be approximately the same as the reference signal, that is, the signal produced from the photoresponsive element $S1a$ of the first sensing means $S_1$. From this view point, signals produced from the photoresponsive elements $S2a$ and $S2c$ of the second sensing means $S_2$ are different in amplitude from the reference signal. Accordingly, the relation between the voltages $V_1$, $V_2$ and $V_3$ of the outputs from the absolute circuits 77, 78 and 79, respectively, is $V_2 < V_1$ and $V_2 < V_3$. This relation causes both of the comparators 80 and 81 to produce low level signals. Since the voltage levels of the voltages $V_1$ and $V_3$ are both greater than the predetermined voltage Vo, the comparators 87 and 89 produce high level signals to the OR element 91, which in turn produces a high level signal.

Under the condition described above, the AND element 84 receives low, high and high level signals from the comparator 80, OR element 91 and NOT element 83, respectively. Thus, the output terminal $Z_3$ of the AND element 84 produces a low level signal. Next, the AND element 85 receives high, high and high level signals from the NOT element 83, OR element 91 and NOT element 82, respectively. Thus, the output terminal $Z_2$ of the AND element 85 produces a high level signal. And, the AND element 86 receives low, high and high level signals from the comparator 81, NOT element 82 and OR element 91, respectively. Thus, the output terminal $Z_1$ of the AND element 86 produces a low level signal. Accordingly, the high level signal from the output terminal $Z_2$ of the AND element 85 indicates the location of the target object.

Thirdly, assuming that the target object is located at the far zone, a signal produced from the photoresponsive element $S2a$ of the second sensing means $S_2$ will be approximately the same as the reference signal, that is, the signal produced from the photoresponsive element $S1a$ of the first sensing means $S_1$. From this view point, a signal produced from the photoresponsive element $S2b$ of the second sensing means $S_2$ will be a little different in amplitude from the reference signal, while a signal produced from the photoresponsive element $S2c$ of the second sensing means $S_2$ will be further different from the reference signal. Accordingly, the relation between the voltage levels $V_1$, $V_2$ and $V_3$ of the outputs from the absolute circuits 77, 78 and 79, respectively, is $V_1 < V_2 < V_3$. This relation causes the comparators 80 and 81 to produce high and low level signals, respectively. Since the voltage levels of the voltages $V_2$ and $V_3$ are greater than the predetermined voltage Vo, the comparators 87 and 88 produce high level signals to the OR element 91, which in turn produces a high level signal.

Under the condition described above, the AND element 84 receives high, high and high level signals from the comparator 80, OR element 91 and NOT element 83, respectively.

Thus, the output terminal $Z_3$ of the AND element 84 produces a high level signal. Whereas the AND element 85 receiving a low level signal from the NOT element 82 produces a low level signal from the output terminal $Z_2$ thereof the AND element 86 receiving low level signals from the comparator 81 and the NOT element 82 produces a low level signal from the output terminal $Z_1$ thereof. Accordingly, the high level signal from the output terminal $Z_3$ of the AND element 84 indicates the location of the target object.

Lastly, assuming that the target object is considerably dark to such an extent as to produce a very weak radiation therefrom or when the target object scarcely has such a contrast as in a white plain wall as to produce a uniform radiation therefrom, a signal produced from any one of the photoresponsive elements $S2a$, $S2b$ and $S2c$ of the second sensing means $S_2$ will be approximately the same as the reference signal. Therefore, the signal produced from any one of the differential amplifiers 74, 75 and 76 will be very low level signals. Accordingly, the relation between the voltage levels $V_1$, $V_2$ and $V_3$ of the outputs from the absolute circuits 77, 78 and 79, respectively, is $V_1 \approx V_2 \approx V_3 < V_o$. This relation causes all the comparators 87, 88 and 89 to produce low level signals to the OR element 91 which in turn produces the low level signal. Accordingly, all the AND elements 84, 85 and 86 produce low level signals.

For constituting a distance measuring element having a plurality of, for example, three pieces of photoresponsive elements in the first sensing means $S_1$, it is necessary to employ differential amplifiers for taking the absolute difference between the signals from the neighboring two photoresponsive elements in the first sensing means and further differential amplifiers for taking the absolute difference between the signals from the neighboring two photoresponsive elements in the second sensing means $S_2$. Such difference signals from the first and second sensing means $S_1$ and $S_2$ are compared in a manner similar to the differential amplifiers 74, 75 and 76 described above.

Since the automatic rangefinder, according to the present invention, is so arranged as to discriminate the failure to find the distance from the camera to the target object before the lens is displaced, it is possible, when the automatic rangefinder fails to produce the distance signal, to disable the shutter releasing mechanism for preventing the film from being exposed. Furthermore, the disabling of the shutter releasing mechanism can be carried out by the employment of discriminator such as an OR element which discriminates the presence and absence of the distance signal produced from the distance measuring element. Therefore, the automatic rangefinder of the present invention can be arranged in a simple construction with a low manufacturing cost. Moreover, by the employment of indication means, it is possible to manually control the shutter release mechanism when the automatic rangefinder fails to produce the distance signal.

Although the present invention has been fully described by way of examples with reference to the accompanying drawings, it is to be noted that various changes and modifications are apparent to those skilled in the art. Therefore, unless such changes and modifications depart from the true scope of the present invention, they should be construed as included therein.

What we claim:

1. An automatic focusing system for use in a photographic camera, which comprises, in combination:
   distance measuring means for producing a zone signal indicative of one zone of distance where a target object to be photographed is located, said one zone of distance being selected from a plurality of zones relative to the camera;
   a discriminator coupled to said distance measuring means for producing, when said distance measuring means produces said zone signal, an actuating signal;
   an objective lens movable from a locked position to one of a plurality of focal positions relative to a focal plane of the camera for focusing on said focal plane an image of the target object located within said zone;
   releasing means for releasing said objective lens from said locked position upon receipt of said actuating signal;
   manual switch means for energizing the distance measuring means; and
   control means for controlling the position of the objective lens automatically in accordance with said zone signal.

2. A system as claimed in claim 1, further comprising a manual control means for producing a substitute signal to replace the zone signal when said distance measuring means fails to produce the zone signal.

3. A system as claimed in claim 1, wherein said discriminator is constituted by an OR element.

4. A system as claimed in claim 1, further comprising an indication means actuated when said distance measuring means fails to produce the zone signal.

5. A system as claimed in claim 4, wherein said indication means is constituted by a light emitting diode coupled to said discriminator and energizable when said distance measuring means fails to produce the zone signal.

6. A system as claimed in claim 1, wherein said distance measuring means includes a plurality of output terminals for producing zone signals of different distances at different output terminals, the number of said output terminals coinciding with the number of said zones.

7. A system as claimed in claim 6, wherein said actuating signal is produced from the discriminator when the zone signal is produced from one of the plurality of output terminals of the distance measuring means.

8. A system as claimed in claim 6, wherein said control means comprises a plurality of control elements which are respectively connected to said output terminals of said distance measuring means, the number of said control elements coinciding with the number of the output terminals of said distance measuring means, said objective lens being moved to one of the focal positions by one control element which is connected to one output terminal of the distance measuring means producing said zone signal.

9. A system as claimed in claim 8, wherein each of said control elements is constituted by an AND element having first and second input terminals, said output terminals of the distance measuring means being connected respectively to the first input terminals of the AND elements.

10. A system as claimed in claim 9, wherein said control means further comprises a plurality of fixed terminal plates equal in number to the number of said AND elements, said fixed terminal plates being connected respectively to the second input terminals of the AND elements, a movable terminal plate movable simultaneously with the movement of said objective lens, said movable terminal plate being sequentially brought into contact with said fixed terminal plates, means for impressing a predetermined voltage to said movable terminal plate for sequentially applying said predetermined voltage to said fixed terminal plates and in turn to the second input terminals of said AND elements, whereby one of said AND elements receiving the zone signal applied to the first input terminal thereof, produces a control signal when said second input terminal thereof receives the predetermined voltage, engaging means for engaging said objective lens to one of said plurality of the focal positions, and holding means for holding said engaging means in a disengaged relation with respect to the objective lens, said holding means being disabled upon receipt of said control signal for allowing said engaging means to engage the objective lens to one focal position.

* * * * *